Feb. 17, 1931.  D. E. SPEICHER  1,793,197
FERTILIZER DISTRIBUTOR
Filed Dec. 13, 1929
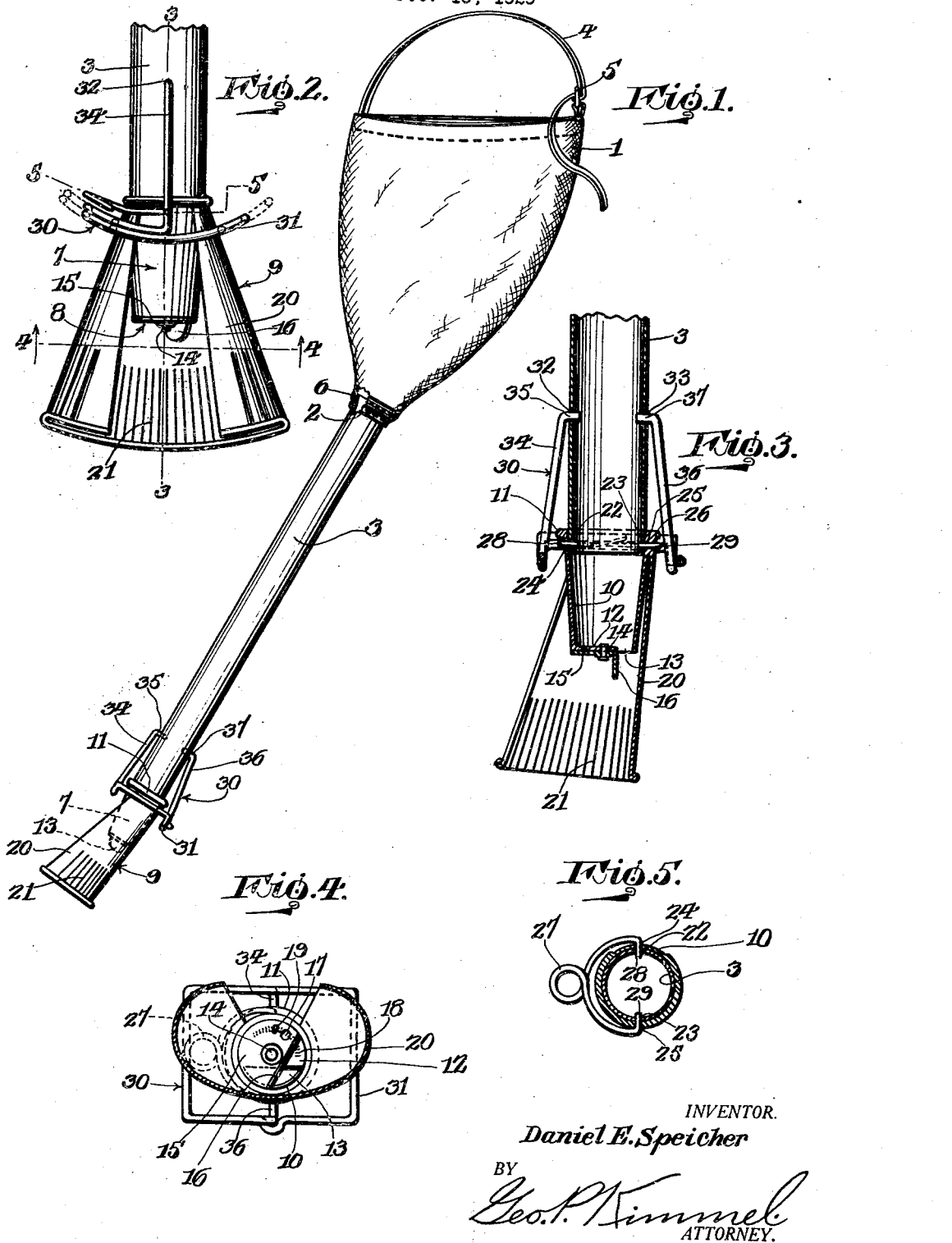
INVENTOR.
Daniel E. Speicher
BY
Geo. P. Kimmel
ATTORNEY.

Patented Feb. 17, 1931

1,793,197

UNITED STATES PATENT OFFICE

DANIEL E. SPEICHER, OF URBANA, INDIANA

FERTILIZER DISTRIBUTOR

Application filed December 13, 1929. Serial No. 413,886.

This invention relates to a fertilizer distributor designed primarily for distributing powdered fertilizer over small areas, such as gardens, around shrubs, leafy plants, potato ground when planting, lawns, etc., but it is to be understood that a distributor, in accordance with this invention, may be employed for distributing any character of material or in any connection for which it may be found applicable.

As is well known, there are many different kinds of commercial fertilizers, some of which are ground to a fine powder and distributed by devices or instruments upon the soil to fertilize the latter, but it has been found that during the act of distributing the powder, the latter banks or clogs in the device, resulting in the distribution being retarded and carried on with difficulty through the feed gauge to which the powder is fed. To overcome the foregoing objection is the primary object of this invention, and to this end the invention resides in the providing, in a manner as hereinafter set forth, a fertilizer distributor including means to prevent the clogging or banking of the fertilizer during the distributing thereof, thereby resulting in a uniform discharge flow.

A further object of the invention is to provide, in a manner as hereinafter set forth, a distributor for powdered fertilizer provided with means automatically acting, during the step of distribution, to prevent the fertilizer from clogging or banking to retard the discharge thereof.

Further objects of the invention are to provide, in a manner as hereinafter set forth, a fertilizer distributor for the purpose referred to which is simple in its construction and arrangement, strong, durable, compact, thoroughly efficient in its use, preventing clogging or banking of the fertilizer being distributed, readily assembled, conveniently handled, and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is an elevation of a fertilizer distributor in accordance with this invention.

Figure 2 is a fragmentary view, upon an enlarged scale and in elevation, of the distributing end of the device.

Figure 3 is a section on line 3—3, Figure 2.

Figure 4 is a section on line 4—4, Figure 2.

Figure 5 is a section on line 5—5, Figure 2.

A distributor, in accordance with this invention, includes an open top suspended container 1 for the powdered fertilizer which is to be distributed, and with the container 1 having an outlet 2 at its bottom into which extends the upper end of a conducting tube 3. As illustrated, the container 1 is in the form of a bag of flexible material, preferably canvas and is provided with a strap 4 and a buckle 5 coacting for the purpose of suspending the container from the shoulder of the operator. The body of the container gradually increases in area from its bottom toward its top. The conducting tube 3 is of any suitable diameter, but the latter will be such as to snugly fit the discharge opening 2 and the bottom of the container 1. The upper end of the tube 3 extends within the bottom of the container 1 and is connected therewith in any suitable manner. The upper terminus of tube 3 is flanged as at 6 and which engages with the inner face of the body portion of the container 1 to prevent the tube 3 from separating from the container 1. The tube 3 is of any desirable length and is adapted to be grasped by the operator when distributing the fertilizer. The operator moves the tube 3 in a to and fro manner, or manually oscillates the tube 3 during the distributing step.

Mounted on and connected to the outer or lower end of the tube 3 is the inner or upper end of a nozzle 7 carrying a gauge element 8 and a spreader 9. The element 8 controls the flow of discharge from the nozzle 7. The spreader 9 acts as a means for spreading the fertilizer discharged from the nozzle 7.

The nozzle 7 comprises a tubular body 10 gradually decreasing in diameter from its inner toward its outer end. The inner end of the nozzle 7 is laterally flanged as at 11. The outer end of nozzle 7 is partly closed by an end piece 12 of a shape to provide a segmental shaped outlet 13 for the powdered fertilizer.

Connected against the outer face of the end 12 by a headed pivot 14 is the revoluble body portion 15 of the gauge element 8. The said body portion 15 conforms in contour to the end piece 12. The pivot 14 is disposed at the axis of the nozzle 7. The body portion 15 of the gauge element 8 has its straight edge provided with an outwardly directed handle piece 16 which registers with the straight wall of the outlet 13. The body portion 15 of element 8 is also formed with an opening 17 in proximity to its outer edge and to said handle piece. The end piece 12 is provided with an arcuate row of indentations or cavities 18 in proximity to the body portion 10 of nozzle 7 and the said indentations or cavities 18 are selectively engaged by a pin 19 carried by the body portion 15 of the element 8, for the purpose of latching element 8 in adjusted position. The body portion 15 of element 8 is employed for increasing or decreasing the size of outlet 13, and said body portion 15 can entirely close said outlet 13 and be adjusted in a manner whereby opening 17 will register with outlet 13 for discharge.

The spreader 9 comprises a body portion 20 of substantially oval contour in cross section at any point throughout its length, formed with a wide split coextensive with the top thereof and of flared contour throughout, that is to say, from its inner to its outer end. The inner or smaller end of body portion 20 is formed integral with the nozzle 7 and abuts against the flange 11 at the inner end of body portion 10 of nozzle 7. Other than the point of connection between the inner end of spreader 9 and nozzle 7, the spreader 9 is spaced throughout from nozzle 7 and projects a substantial distance beyond the outer end of nozzle 7. The outer marginal part of body portion 20 of the spreader 9 is provided with lengthwise extending corrugations 21 which act to spread the fertilizer as it flows from the nozzle onto spreader 9, and the latter extends at an inclination toward the axis of the nozzle.

The outer or lower end of tube 3 is formed with a pair of diametrically opposed openings 22, 23, the former registering with an opening 24 formed in the inner end of body portion 10, and the latter registering with an opening 25 also provided in the inner end of the body portion 10. The body portion 20 of the spreader is formed with an opening 26 which registers with opening 25 formed in the body portion of the nozzle. The nozzle 7 is latched to tube 3 by a resilient latching member 27 having inturned ends 28, 29, the former extending through the registering openings 22, 24 and the latter extending through the registering openings 23, 25 and 26. The openings 24, 25 and 26 are arranged in close proximity to the flange 11.

Carried by the tube 3 and extending upon the inner end of spreader 9 is an oscillatory knocker element 30 adapted to alternately abut the sides of spreader 9, during the to and fro or oscillatory movement of tube 3 to prevent banking or clogging of the powder.

The knocker element 30 is formed from a single length of wire of the desired gauge bent to provide a body portion having extending therefrom a pair of opposed spaced arms. The body portion of the element 30 is indicated at 31 and is of skeleton and of arcuate contour. The body portion 31 consists of a top part, a bottom part and a pair of end parts, each of a height less than the length of either the top or bottom part. The inner end of the spreader 9 extends through the body portion 31 and the latter is normally spaced throughout from the spreader. The end parts of the body portion 31 of the knocker element alternately engage with opposite sides of the spreader to prevent the clogging or banking of the material on its passage to the discharge point at the outer end of the nozzle. The element 30 is loosely suspended relative to the tube 3 and spreader 9, and its movement is free, or in other words, it will freely oscillate in opposite directions and with its oscillatory movement in one direction and in the other direction alternately arrested by the alternate end contact of the body portion 31 with the alternate sides at the inner end of the spreader.

The element 30 is pivotally connected to the conducting tube 3 and for such purpose the latter is provided at points diametrically opposite, at a substantial distance from the outer end thereof with a pair of openings 32, 33. The said openings are arranged at the top and at the bottom of the tube 3. Extending from a point centrally with respect to the top part of body portion 31 is an arm 34 having an inturned end 35 which extends into the opening 32. Extending from and centrally of the bottom part of body portion 31 is an arm 36 having an inturned end 37 which is mounted in the opening 33. The arms 34, 36 from their outer ends incline toward the tube 3. The arms 34, 36 further act to maintain the top and bottom of body portion 31 permanently clear from the top and bottom of the spreader 9. The connection between the ends 35 and 37 and the tube 3 is a loose one, so that the knocker element 30 is free to oscillate when occasion requires.

It is thought the many advantages of a fertilizer distributor in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:—

1. A fertilizer distributor including a conducting tube, a controllable nozzle at the outer end thereof, a spreader surrounding, connected to, spaced from and projecting beyond said nozzle, and an oscillatory knocker element pivotally connected to said tube and opposing the sides of said spreader.

2. A fertilizer distributor comprising a conducting tube having a controllable discharge end for the fertilizer, and an oscillatory knocker element pivotally supported from and arranged exteriorly of said tube for alternately impacting the outer face of opposite sides of said discharge end to prevent the banking or clogging of the fertilizer within the tube.

3. A fertilizer distributor comprising a conducting tube having a controllable discharge end for the fertilizer, and an oscillatory knocker element pivotally supported from said tube for alternately impacting opposite sides of said discharge end to prevent the banking or clogging of the fertilizer within the tube, said element including a skeleton body portion through which extends the said discharge end.

4. A fertilizer distributor comprising a conducting tube having a controllable discharge end for the fertilizer, and an oscillatory knocker element pivotally supported from said tube for alternately impacting opposite sides of said discharge end to prevent the banking or clogging of the fertilizer within the tube, said element including a body portion in the form of a frame and of arcuate contour and through which extends said discharge end.

5. A fertilizer distributor comprising a conducting tube having a controllable discharge end, and a frame including top, bottom and a pair of end portions, said end portions opposing the sides of said discharge end, said top and bottom portions being of greater length than the diameter of said discharge end, and means projecting from said top and bottom portions and engaging said tube for suspending the frame in spaced relation with respect to the discharge end and to permit of free oscillation of the frame on oscillatory movement of the tube whereby the end portions of the frame will alternately impact against opposite sides of said discharge end to prevent the banking or clogging of the fertilizer material within the tube.

6. In a fertilizer distributor, an oscillatory knocker element to prevent banking and clogging of the fertilizer when passing through a conducting tube through the discharge end of the latter, said element including a frame having a top portion, a bottom portion and a pair of end portions and said end portions adapted to oppose the sides of said discharge end, said top and bottom portions being of greater length than the diameter of said discharge end, and means projecting from the top and bottom portions of the frame and adapted to engage in the tube for suspending the frame in spaced relation with respect to said discharge end and to permit of the oscillation of the frame on the shift of the tube.

7. In a fertilizer distributor, an oscillatory knocker element to prevent banking and clogging of the fertilizer when passing through a conducting tube through the discharge end of the latter, said element including a frame having a top portion, a bottom portion and a pair of end portions and said end portions adapted to oppose the sides of said discharge end, said top and bottom portions being of greater length than the diameter of said discharge end, and means projecting from the top and bottom portions of the frame and adapted to engage in the tube for suspending the frame in spaced relation with respect to said discharge end and to permit of the oscillation of the frame on the shift of the tube, said frame being of arcuate contour.

In testimony whereof, I affix my signature hereto.

DANIEL E. SPEICHER.